(12) United States Patent
Sanzari et al.

(10) Patent No.: US 12,416,246 B2
(45) Date of Patent: Sep. 16, 2025

(54) BEARING INNER RACE WITH SLEEVE AND INTEGRATED PULLER

(71) Applicant: Pratt & Whitney Canada Corp., Longueuil (CA)

(72) Inventors: Lorenzo Sanzari, Montreal (CA); Guy Lefebvre, St-Bruno (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/340,443

(22) Filed: Jun. 23, 2023

(65) Prior Publication Data

US 2024/0426227 A1 Dec. 26, 2024

(51) Int. Cl.
*F01D 25/16* (2006.01)
*F16C 35/06* (2006.01)
*F16C 35/073* (2006.01)

(52) U.S. Cl.
CPC ............ *F01D 25/16* (2013.01); *F16C 35/062* (2013.01); *F16C 35/073* (2013.01); *F05D 2230/72* (2013.01); *F05D 2240/54* (2013.01)

(58) Field of Classification Search
CPC .............. F16C 35/062; F16C 19/04–08; F16C 2237/00; F16C 35/073; F16C 33/1055; F01D 25/16
See application file for complete search history.

(56) References Cited

U.S. PATENT DOCUMENTS

| | | | | |
|---|---|---|---|---|
| 2,690,346 A | * | 9/1954 | Miller | F16C 35/073 384/538 |
| 3,953,142 A | * | 4/1976 | Price | F16D 1/096 384/538 |
| 4,456,425 A | * | 6/1984 | McCarty | F16H 1/14 74/416 |
| 5,373,636 A | * | 12/1994 | Martinie | B25B 27/062 29/256 |

(Continued)

FOREIGN PATENT DOCUMENTS

| | | |
|---|---|---|
| DE | 202013008469 U1 | 1/2015 |
| JP | 2010169150 A * | 8/2010 ............ F16C 25/083 |

OTHER PUBLICATIONS

Gorla, Rama and Aijaz Khan. Turbomachinery Design and Theory. New Yor, NY, Marcel Dekker, 2003. Chapter 1, section 1.2. (Year: 2003).*

(Continued)

*Primary Examiner* — Topaz L. Elliott
(74) *Attorney, Agent, or Firm* — CANTOR COLBURN LLP

(57) ABSTRACT

A bearing assembly for a turbomachine includes a bearing inner race, a bearing outer race located radially outwardly from the bearing inner race, and one or more bearing elements located radially between the bearing inner race and the bearing outer race. A bearing sleeve is positioned radially inboard of the bearing inner race and is configured for engagement with a rotating component. The bearing sleeve includes a sleeve body located radially between the bearing (Continued)

inner race and the rotating component, and a puller feature extending from the sleeve body at a first axial end of the bearing sleeve. The puller feature is configured for application of a removal force thereto to remove the bearing from an installed position in the turbomachine.

16 Claims, 2 Drawing Sheets

(56) References Cited

U.S. PATENT DOCUMENTS

| | | | |
|---|---|---|---|
| 7,356,926 | B2 | 4/2008 | Bridges et al. |
| 9,409,266 | B2 * | 8/2016 | Buldtmann ............ F01D 25/285 |
| 2005/0259905 | A1 * | 11/2005 | Hansen ................. F16C 35/073 |
| | | | 384/538 |
| 2009/0297083 | A1 * | 12/2009 | Raberin ................ F16C 35/073 |
| | | | 384/537 |
| 2014/0130352 | A1 * | 5/2014 | Buldtmann ............ F01D 25/285 |
| | | | 29/888.3 |
| 2015/0226265 | A1 * | 8/2015 | Bourgeois ................. B66C 1/62 |
| | | | 29/259 |
| 2017/0226894 | A1 | 8/2017 | Ganiger et al. |
| 2018/0038378 | A1 | 2/2018 | DiBenedetto |
| 2021/0332775 | A1 | 10/2021 | Yuen et al. |
| 2022/0127973 | A1 * | 4/2022 | Lagarde ................. F01D 25/16 |
| 2022/0290617 | A1 * | 9/2022 | Marlin ..................... F02C 7/36 |

OTHER PUBLICATIONS

Extended European Search Report for EP Application No. 24183513.1, dated Dec. 11, 2024, pp. 1-6.

* cited by examiner

BEARING INNER RACE WITH SLEEVE AND INTEGRATED PULLER

BACKGROUND

Exemplary embodiments pertain to the art of turbomachinery such as gas turbine engines. In particular, the present disclosure relates to bearing assemblies of gas turbine engines.

Turbomachines, such as gas turbine engines typically include one or more bearing assemblies to radially and/or axially support the rotating components of the turbomachine. The bearing assemblies typically include radially inner and outer rings or races, rolling elements such as rollers or balls disposed between the inner and outer races, and a cage to keep the rolling elements separated and help guide their motion. The inner race is typically press fit onto a rotating component, such as a shaft, while the outer race is typically a close push fit to a rotationally stationary component, such as a wall or flange of a bearing housing.

To achieve installation of the bearing, in particular installation of the inner race to the shaft a force is applied to a first race surface in the installation direction to press fit the inner race to the shaft. When it is desired to disassemble the bearing, a removal force is applied to a second race surface, opposite the first race surface, at an opposite end of the inner race to pull the inner race from the shaft. To access the second race surfaces, a specialized tool is often needed to reach the surface and allow for applying the removal force. Because of the various designs of bearing assemblies and the compartments in which they are located, these removal tools are different for each bearing assembly. Further, in some turbomachine configurations or bearing assembly locations, there is insufficient access to reach the second race surface even with a specialized tool.

BRIEF DESCRIPTION

In one embodiment, a bearing assembly for a turbomachine includes a bearing inner race, a bearing outer race located radially outwardly from the bearing inner race, and one or more bearing elements located radially between the bearing inner race and the bearing outer race. A bearing sleeve is positioned radially inboard of the bearing inner race and is configured for engagement with a rotating component. The bearing sleeve includes a sleeve body located radially between the bearing inner race and the rotating component, and a puller feature extending from the sleeve body at a first axial end of the bearing sleeve. The puller feature is configured for application of a removal force thereto to remove the bearing from an installed position in the turbomachine.

Additionally or alternatively, in this or other embodiments the first axial end of the bearing sleeve is further configured for application of an installation force thereto to install the bearing into the installed position.

Additionally or alternatively, in this or other embodiments the puller feature is a sleeve flange extending radially outwardly from the sleeve body.

Additionally or alternatively, in this or other embodiments a locating protrusion extends from the sleeve body and is engageable with the bearing inner race to axially locate the bearing sleeve relative to the bearing inner race.

Additionally or alternatively, in this or other embodiments the axial location of the bearing sleeve relative to the bearing inner race results in an axial gap between the bearing inner race and the puller feature.

Additionally or alternatively, in this or other embodiments the bearing sleeve is press fit between the rotating component and the bearing inner race.

Additionally or alternatively, in this or other embodiments the bearing sleeve is a full unitary ring.

Additionally or alternatively, in this or other embodiments the puller feature is formed integral to the sleeve body.

Additionally or alternatively, in this or other embodiments one or more of the bearing inner race and the bearing outer race are full unitary rings.

Additionally or alternatively, in this or other embodiments the one or more bearing elements are one or more spherical balls or cylindrical rollers.

In another embodiment, a turbomachine includes one or more rotating shafts, one or more turbines operably connected to the one or more rotating shafts and one or more bearing assemblies, each bearing assembly supportive of a shaft of the one or more rotating shafts. A bearing assembly of the one or more bearing assemblies includes a bearing inner race, a bearing outer race positioned radially outwardly from the bearing inner race, and one or more bearing elements located radially between the bearing inner race and the bearing outer race. A bearing sleeve is located radially inboard of the bearing inner race and configured for engagement with the shaft. The bearing sleeve includes a sleeve body positioned radially between the bearing inner race and the shaft, and a puller feature extending from the sleeve body at a first axial end of the bearing sleeve. The puller feature is configured for application of a removal force thereto to remove the bearing from an installed position in the turbomachine.

Additionally or alternatively, in this or other embodiments the first axial end of the bearing sleeve is further configured for application of an installation force thereto to install the bearing into the installed position.

Additionally or alternatively, in this or other embodiments the puller feature is a sleeve flange extending radially outwardly from the sleeve body.

Additionally or alternatively, in this or other embodiments a locating protrusion extends from the sleeve body and is engageable with the bearing inner race to axially locate the bearing sleeve relative to the bearing inner race.

Additionally or alternatively, in this or other embodiments the axial location of the bearing sleeve relative to the bearing inner race results in an axial gap between the bearing inner race and the puller feature.

Additionally or alternatively, in this or other embodiments the bearing sleeve is press fit between the shaft and the bearing inner race.

Additionally or alternatively, in this or other embodiments the bearing sleeve is a full unitary ring.

Additionally or alternatively, in this or other embodiments the puller feature is formed integral to the sleeve body.

Additionally or alternatively, in this or other embodiments one or more of the bearing inner race and the bearing outer race are full unitary rings.

Additionally or alternatively, in this or other embodiments the one or more bearing elements are one or more spherical balls or cylindrical rollers.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
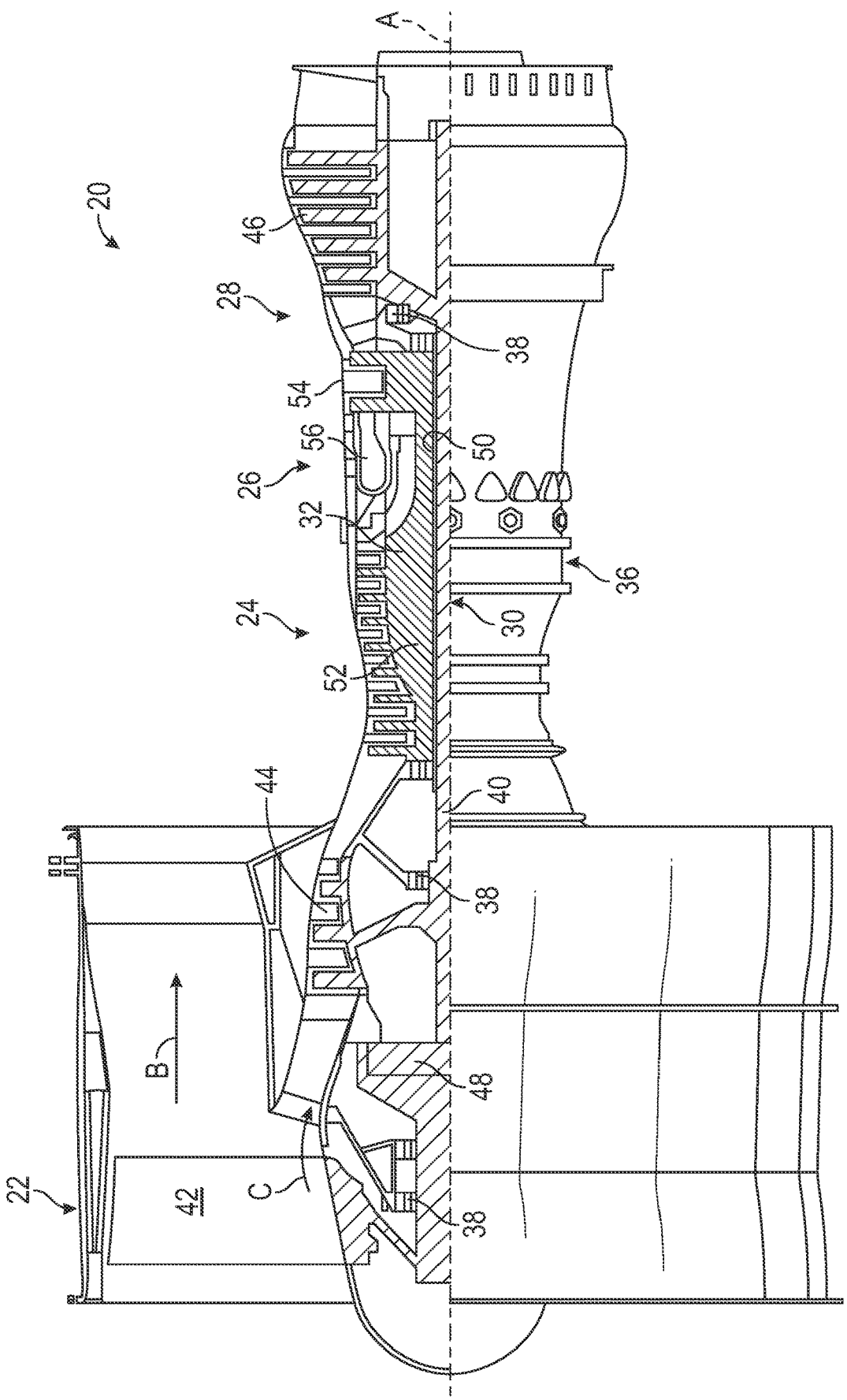
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Figure 2:
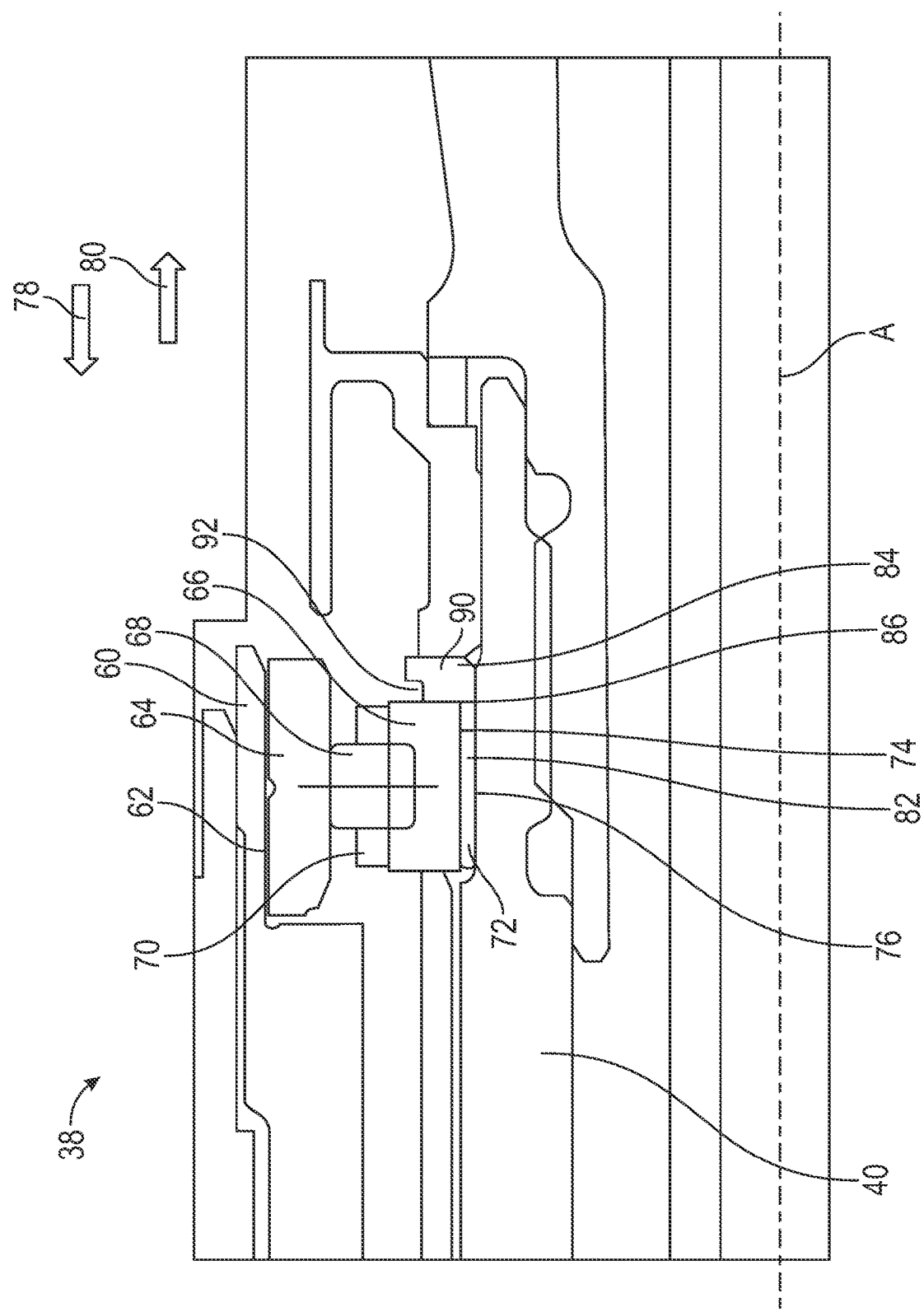
FIG. 2 is a partial cross-sectional view of an embodiment of a bearing of a gas turbine engine.

Referring now to FIG. 2, illustrated is an exemplary embodiment of a bearing 38. The exemplary bearing 38 may be located at, for example, the inner shaft 40 or the outer shaft 50. In the following description, the shaft is an inner shaft 40, but one skilled in the art will readily appreciate that this is merely exemplary, and that the shaft may be an outer shaft 50 or any other shaft or rotating component. The bearing 38 is located in a housing 60 located at a radially outer extent of the bearing 38, with components of the bearing 38 being disposed inside, or radially inboard of, a housing inner wall 62 of the housing 60. A bearing outer race 64 is located inside the housing 60 at the housing inner wall 62. The bearing outer race 64, in some embodiments, is a full ring extending a full rotation about the engine central longitudinal axis A. In some embodiments, the bearing outer race 64 has a close radial fit to the housing inner wall 62. A bearing inner race 66 is located at the inner shaft 40 and in some embodiments is a full ring extending a full rotation about the engine central longitudinal axis A. One or more bearing elements 68 are disposed radially between the bearing outer race 64 and the bearing inner race 66 and are arrayed circumferentially about the engine central longitudinal axis A. The bearing elements 68 may be, for example, spherical balls or may be cylindrical rollers. These configurations of bearing elements 68 are, however, merely exemplary and one skilled in the art will readily appreciate that other bearing elements shapes may be utilized. The bearing elements 68 contact the bearing outer race 64 and the bearing inner race 66 to support the shaft 40 relative to the housing 60. In some embodiments, the bearing elements 68 are retained in a cage 70, to maintain a selected circumferential spacing between the bearing elements 68 and to also guide the motion of the bearing elements 68.

A bearing sleeve 72 is disposed radially between a radially inner surface 74 of the bearing inner race 66 and a shaft outer surface 76 of the shaft 40, and in some embodiments has a press fit between the bearing inner race 66 and the shaft 40. The bearing sleeve 72, in some embodiments, is a full ring extending circumferentially about the engine central longitudinal axis A between the bearing inner race 66 and the shaft 40.

The bearing 38 is configured for installation between the housing 60 and the shaft 40 in a first axial direction, referred to herein as installation direction 78 and is configured for removal from its installed position in a second axial direction, or removal direction 80 opposite the installation direction 78. The bearing sleeve 72 is configured to aid in removal of the bearing 38 in the removal direction 80. To this end, the bearing sleeve 72 includes a sleeve body 82 disposed between the shaft outer surface 76 and the bearing inner race 66. The sleeve body 82 is configured to have a press fit to the shaft outer surface 76 and to the bearing inner race 66. The bearing sleeve 72 further includes an integral puller feature, such as a sleeve flange 84 disposed at a body end 86 of the sleeve body 82, and extending radially outwardly from the sleeve body 82, relative to the engine central longitudinal axis A. While in the embodiment illustrated the puller feature is the sleeve flange 84, in other embodiments the puller feature may have another configuration, such as a hook, tab or slot feature to which a removal tool, may be connected. In some embodiments, the sleeve body 82 includes a locating protrusion 90 to axially located the bearing sleeve 72 on the bearing inner race 66, which in some embodiments leaves an axial gap 92 between the bearing inner race 66 and the sleeve flange 84 allowing the removal tool to be engaged with the sleeve flange 84 between the sleeve flange 84 and the bearing inner race 66.

To install the bearing 38 to the shaft 40, an installation or pushing force is applied to the body end 86 or alternatively to the sleeve flange 84 to move the bearing 38 in the installation direction 78 until the bearing 38 is in the installed position as shown in FIG. 2. To disassemble the bearing 38 from the shaft 40, a removal or pulling force is applied to the sleeve flange 84 via, for example, the removal tool to pull the bearing 38 in the removal direction 80. The puller feature, such as the sleeve flange 84, allows for both the removal force and the installation force to be applied at the same axial end of the bearing 38. This allows for ease of removal of the bearing 38 in configurations where the opposing axial end of the bearing is not accessible for applying the removal force. Further, use of the bearing sleeve 72, allows for use of the same bearing on shafts 40 having different diameters, requiring changes only to the bearing sleeve 72 to fit the bearing 38 to the shaft 40. Additionally, use of the bearing sleeve 72 allows for simpler designs of components around the bearing 38 since accessibility to the opposing axial end of the bearing 38 for removal is not a concern.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bearing and shaft assembly of a turbomachine, comprising:
    a bearing inner race;
    a bearing outer race disposed radially outwardly from the bearing inner race;
    one or more bearing elements located radially between the bearing inner race and the bearing outer race; and
    a bearing sleeve disposed radially inboard of the bearing inner race and configured for engagement with a shaft supporting a rotor of the turbomachine, the bearing sleeve including:
    a sleeve body disposed radially between the bearing inner race and the rotor shaft;
    a puller feature extending from the sleeve body at a first axial end of the bearing sleeve, the puller feature configured for application of a removal force thereto to remove the bearing from an installed position in the turbomachine; and
    a locating protrusion extending from the sleeve body and engageable with the bearing inner race to axially locate the bearing sleeve relative to the bearing inner race, the locating protrusion positioned axially between the puller feature and the bearing inner race;
    wherein the locating protrusion axially abuts the bearing inner race so that a channel is defined by the puller feature, the bearing inner race, and the locating protrusion.

2. The bearing assembly of claim 1, wherein the first axial end of the bearing sleeve is further configured for application of an installation force thereto to install the bearing into the installed position.

3. The bearing assembly of claim 1, wherein the puller feature is a sleeve flange extending radially outwardly from the sleeve body.

4. The bearing assembly of claim 1, wherein the bearing sleeve is press fit between the rotor and the bearing inner race.

5. The bearing assembly of claim 1, wherein the bearing sleeve is a full unitary ring.

6. The bearing assembly of claim 1, wherein the puller feature is formed integral to the sleeve body.

7. The bearing assembly of claim 1, wherein one or more of the bearing inner race and the bearing outer race are full unitary rings.

8. The bearing assembly of claim 1, wherein the one or more bearing elements are one or more spherical balls or cylindrical rollers.

9. A gas turbine engine, comprising:
one or more rotating shafts;
one or more turbines operably connected to the one or more rotating shafts;
one or more bearing assemblies, each bearing assembly supportive of a corresponding shaft of the one or more rotating shafts, a bearing assembly of the one or more bearing assemblies, including:
a bearing inner race;
a bearing outer race disposed radially outwardly from the bearing inner race;
one or more bearing elements located radially between the bearing inner race and the bearing outer race; and
a bearing sleeve disposed radially inboard of the bearing inner race and engaged with the corresponding shaft, the bearing sleeve including:
a sleeve body disposed radially between the bearing inner race and the corresponding shaft;
a puller feature extending from the sleeve body at a first axial end of the bearing sleeve, the puller feature configured for application of a removal force thereto to remove the bearing from an installed position in the turbomachine; and
a locating protrusion extending from the sleeve body and engageable with the bearing inner race to axially locate the bearing sleeve relative to the bearing inner race, the locating protrusion positioned axially between the puller feature and the bearing inner race;
wherein the locating protrusion axially abuts the bearing inner race so that a channel is defined by the puller feature, the bearing inner race, and the locating protrusion.

10. The gas turbine engine of claim 9, wherein the first axial end of the bearing sleeve is further configured for application of an installation force thereto to install the bearing into the installed position.

11. The gas turbine engine of claim 9, wherein the puller feature is a sleeve flange extending radially outwardly from the sleeve body.

12. The gas turbine engine of claim 9, wherein the bearing sleeve is press fit between the shaft and the bearing inner race.

13. The gas turbine engine of claim 9, wherein the bearing sleeve is a full unitary ring.

14. The gas turbine engine of claim 9, wherein the puller feature is formed integral to the sleeve body.

15. The gas turbine engine of claim 9, wherein one or more of the bearing inner race and the bearing outer race are full unitary rings.

16. The gas turbine engine of claim 9, wherein the one or more bearing elements are one or more spherical balls or cylindrical rollers.

* * * * *